United States Patent
Wu et al.

(10) Patent No.: US 9,989,812 B2
(45) Date of Patent: Jun. 5, 2018

(54) SEALANT, METHOD FOR PRODUCING BEZEL-LESS LIQUID CRYSTAL DISPLAY, AND BEZEL-LESS LIQUID CRYSTAL DISPLAY PRODUCED BY THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaojuan Wu, Beijing (CN); Yao Bi, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/529,449

(22) PCT Filed: Oct. 8, 2016

(86) PCT No.: PCT/CN2016/101477
§ 371 (c)(1),
(2) Date: May 24, 2017

(87) PCT Pub. No.: WO2017/166769
PCT Pub. Date: Oct. 5, 2017

(65) Prior Publication Data
US 2018/0113338 A1    Apr. 26, 2018

(30) Foreign Application Priority Data
Apr. 1, 2016   (CN) .......................... 2016 1 0202024

(51) Int. Cl.
*C09J 129/04* (2006.01)
*C09J 131/04* (2006.01)
(Continued)

(52) U.S. Cl.
CPC ............. *G02F 1/1339* (2013.01); *C09J 11/06* (2013.01); *C09J 129/04* (2013.01); *C09J 131/04* (2013.01);
(Continued)

(58) Field of Classification Search
CPC ............. G02F 1/133308; G02F 1/1339; C09J 129/00–129/14; C09J 127/00–127/20
See application file for complete search history.

(56) References Cited

U.S. PATENT DOCUMENTS 4,297,401 A * 10/1981 Chern .................... C08G 59/68
349/190
2011/0236643 A1* 9/2011 Tsubouchi ........ G02F 1/133308
156/273.3
(Continued)

FOREIGN PATENT DOCUMENTS

CN       1886479 A     12/2006
CN     103992749 A      8/2014
(Continued)

OTHER PUBLICATIONS

Chen et al. "Photothermal effect of azopyridine compounds and their applications" RSC Adv., 2015, 5, 4675-4680.*
(Continued)

*Primary Examiner* — Mariceli Santiago
(74) *Attorney, Agent, or Firm* — Kinney & Lange, P.A.

(57) ABSTRACT

A sealant (9), a method for producing bezel-less liquid crystal display, and a bezel-less liquid crystal display produced by the same. The sealant (9) comprises: an azopyri-
(Continued)

dine derivative represented by the structural formula (1); one or more of polyvinyl alcohol and ethylene-vinyl acetate copolymer; and a solvent, wherein m in the structural formula (1) is an integer of 8-20; and a mass ratio of the azopyridine derivative to the one or more of polyvinyl alcohol and ethylene-vinyl acetate copolymer is 1/99-15/85. A color filter substrate (6) and an array substrate (7) of a liquid crystal display are bound under the irradiation of ultraviolet light by using the photothermal effect and the binding property of a mixture of an azopyridine derivative and one or more of polyvinyl alcohol and ethylene-vinyl acetate copolymer, while the bezel of the liquid crystal display panel is not occupied, so as to obtain a bezel-less liquid crystal display.

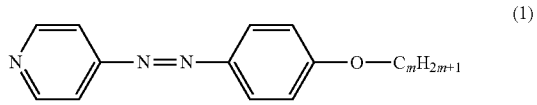

(1)

15 Claims, 3 Drawing Sheets

(51) Int. Cl.
*G02F 1/1341* (2006.01)
*G02F 1/1339* (2006.01)
*G02F 1/13* (2006.01)
*C09J 11/06* (2006.01)
*C08K 5/3432* (2006.01)
*G02F 1/1368* (2006.01)
*G02F 1/1335* (2006.01)

(52) U.S. Cl.
CPC .......... *G02F 1/1303* (2013.01); *C08K 5/3432* (2013.01); *G02F 1/1341* (2013.01); *G02F 1/1368* (2013.01); *G02F 1/133514* (2013.01); *G02F 2202/025* (2013.01)

(56) References Cited

U.S. PATENT DOCUMENTS

2015/0260907 A1* 9/2015 Yang .................... G02B 6/0088
362/97.3
2015/0355498 A1* 12/2015 Yoshida ............ G02F 1/133308
349/110

FOREIGN PATENT DOCUMENTS

| CN | 104910701 A | 9/2015 |
| CN | 105131887 A | 12/2015 |
| CN | 105676545 A | 6/2016 |

OTHER PUBLICATIONS

International Search Report and Written Opinion dated Jan. 5, 2017, for corresponding PCT Application No. PCT/CN2016/101477.

* cited by examiner

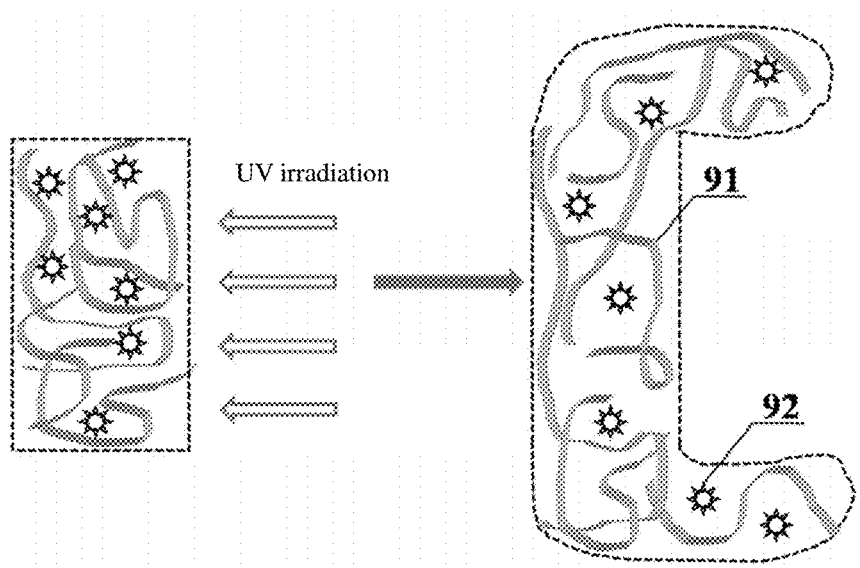

Fig. 3

Applying the sealant for the display to opposite inner sides of a plurality of oppositely placed fixing pieces Loading liquid crystal molecules between an array substrate and a color filter substrate, performing cell alignment, then placing the array substrate and the color filter substrate between the opposite inner sides of the plurality of the fixing pieces, so that opposite bezels of the array substrate and the color filter substrate which are overlapped are brought into contact with the sealant Performing ultraviolet light irradiation on an obtained structure, to obtain a liquid crystal display panel with a cured bezel Separating the liquid crystal display panel with the cured bezel from the fixing pieces

Fig. 4

SEALANT, METHOD FOR PRODUCING BEZEL-LESS LIQUID CRYSTAL DISPLAY, AND BEZEL-LESS LIQUID CRYSTAL DISPLAY PRODUCED BY THE SAME

TECHNICAL FIELD

The present disclosure relates to the field of display manufacture, and more particularly to a sealant, a method for producing a bezel-less liquid crystal display, and a bezel-less liquid crystal display produced by this method.

BACKGROUND ART

Narrow-bezel liquid crystal displays have become research hotspots in the field of displays due to advantages such as good appearance, larger display images, better user experience, etc.

Typically, the size of the bezel of the liquid crystal display panel is determined by the width of the sealant, the distance from the sealant to the edge of the glass, and the distance from the sealant to the liquid crystal display region. In the prior art, zero-scribing-and-breaking for sealant may be used to reduce the distance from the sealant to the edge of the glass so as to reduce the size of the bezel of the liquid crystal display panel. At the meanwhile, in the prior art, since the sealant is applied in a liquid state onto a panel and then ultraviolet-cured and thermocured, there must be a certain wet width and dry width. Therefore, in the prior art, it is difficult to reduce the size of the bezel of the liquid crystal display panel by reducing the width of the sealant, and thereby bezellessness is not achieved.

As a result, it is of important sense to develop a sealant for producing a bezel-less liquid crystal display and a method for producing a bezel-less liquid crystal display.

SUMMARY

Through intensive and detailed studies, the inventors of this invention provide a novel and simple method for obtaining a bezel-less liquid crystal display, wherein a color filter substrate and an array substrate are bound under the irradiation of ultraviolet light by using the photothermal effect and the binding property of a mixture of an azopyridine derivative and one or more of polyvinyl alcohol and ethylene-vinyl acetate copolymer, while the bezel of the liquid crystal display panel is not occupied.

According to a first aspect of the present disclosure, there is provided a sealant, comprising:

an azopyridine derivative represented by the following structural formula (1):

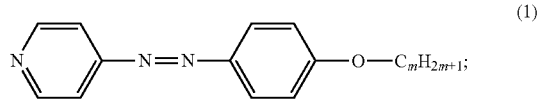

(1)

one or more of polyvinyl alcohol and ethylene-vinyl acetate copolymer; and a solvent, wherein m in the structural formula (1) is an integer of 8-20; and the mass ratio of the azopyridine derivative to the one or more of polyvinyl alcohol and ethylene-vinyl acetate copolymer is 1/99-15/85.

According to a second aspect of the present disclosure, there is provided a method for producing a bezel-less liquid crystal display, comprising:

applying the sealant of the first aspect used for a liquid crystal display to opposite inner sides of a plurality of oppositely placed fixing pieces;

loading liquid crystal molecules between an array substrate and a color filter substrate, performing cell alignment, and then placing the array substrate and the color filter substrate between the opposite inner sides of the plurality of the fixing pieces, so that bezels of the array substrate and the color filter substrate against the fixing pieces after the cell alignment are brought into contact with the sealant;

performing ultraviolet light irradiation on a structure obtained in step (2) to obtain a liquid crystal display panel with a cured bezel; and separating the liquid crystal display panel with a cured bezel from the fixing pieces.

According to a third aspect of the present disclosure, there is provided a bezel-less liquid crystal display, which is produced by the method for producing a bezel-less liquid crystal display according to the above second aspect.

BRIEF DESCRIPTION OF DRAWINGS

FIG. 3 is a structural schematic diagram of molecules of a sealant according to one embodiment of this disclosure in the process of a method for producing a bezel-less liquid crystal display, wherein 91 represents one or more of polyvinyl alcohol and ethylene-vinyl acetate copolymer and 92 represents an azopyridine derivative;

FIG. 4 is a process flow chart of a method for producing a bezel-less liquid crystal display according to one embodiment of this disclosure.

DESCRIPTION OF EMBODIMENTS

Figure 1:
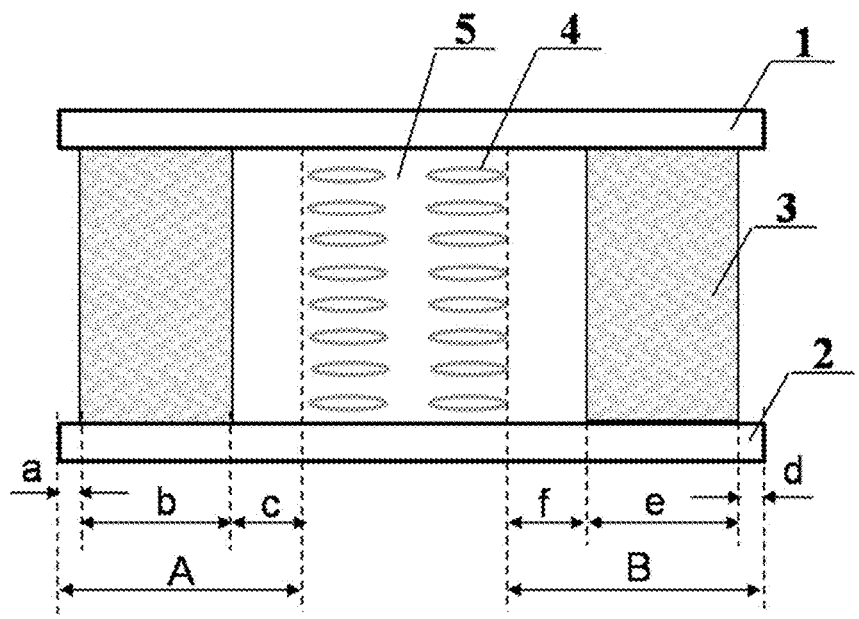
FIG. 1 shows a schematic diagram of the structure of a conventional display in the prior art, wherein 1 represents a color filter substrate, 2 represents an array substrate, 3 represents a sealant, 4 represents liquid crystal molecules, and 5 represents a display region.

FIG. 1 shows a schematic diagram of the structure of a conventional display in the prior art. In FIG. 1, 1 represents a color filter substrate, 2 represents an array substrate, 3 represents a sealant, 4 represents liquid crystal molecules, and 5 represents a display region. The size of the bezel of the liquid crystal display panel is determined by the width of the sealant (as shown by b or e in FIG. 1), the distance from the sealant to the edge of the glass (as shown by a or d in FIG. 1), and the distance from the sealant to the liquid crystal display region (as shown by c or f in FIG. 1). The size of the left bezel of the liquid crystal display panel is A=a+b+c, and the size of the right bezel thereof is B=d+e+f. In the prior art, zero-scribing-and-breaking for sealant may be used to reduce the distance from the sealant to the edge of the glass (i.e., to reduce the sizes of a and d) so as to reduce the size of the bezel of the liquid crystal display panel, but the reduced distance is limited. Since the sealant is applied in a liquid state onto a panel and then ultraviolet-cured and thermocured in the prior art, there must be a certain wet width and dry width. That is, b and e must have certain sizes, which will be difficultly reduced. That is, it is difficult to reduce the size of the bezel of the liquid crystal display panel by reducing the width of the sealant. At the meanwhile, in order to prevent the contamination of liquid crystal molecules by small molecules in the sealant before polymerization, a certain distance is needed from the sealant to the liquid crystal display. Therefore, it is difficult to achieve a bezel-less liquid crystal display in the prior art.

The inventors of this invention provide a novel and simple method for obtaining a bezel-less liquid crystal display, wherein a color filter substrate and an array substrate are bound under the irradiation of ultraviolet light by using the photothermal effect and the binding property of a mixture of an azopyridine derivative and one or more of polyvinyl alcohol and ethylene-vinyl acetate copolymer, while the bezel of the liquid crystal display panel is not occupied.

Particularly, one embodiment of this disclosure provides a sealant, comprising:

an azopyridine derivative represented by the following structural formula (1):

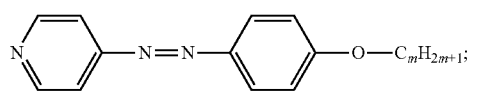

one or more of polyvinyl alcohol and ethylene-vinyl acetate copolymer; and a solvent, wherein m in the structural formula (1) is an integer of 8-20, preferably an integer of 10-14; and the mass ratio of the azopyridine derivative to the one or more of polyvinyl alcohol and ethylene-vinyl acetate copolymer is 1/99-15/85, preferably 5/95-10/90, and more preferably 8/92-10/90.

The azopyridine derivative having the structure represented by the structural formula (1) used in one embodiment of this disclosure may convert ultraviolet light absorbed to thermal energy under the irradiation of ultraviolet light so as to increase the temperature thereof and generate thermal expansion; and at the meanwhile, since the longer terminal alkyl chain in the azopyridine derivative has the effect of soakage, it may have the effect of binding.

Polyvinyl alcohol used in one embodiment of this disclosure is obtained by the alcoholysis of polyvinyl acetate catalyzed by a base or an acid, and has good film-forming property and binding property. The binding property thereof may be increased after it is mixed with an azopyridine derivative. According to some embodiments of this disclosure, the weight average molecular weight of the polyvinyl alcohol is 130,000-220,000, preferably 150,000-200,000, and more preferably 150,000-180,000.

The ethylene-vinyl acetate copolymer used in one embodiment of this disclosure is a high-molecular polymer which is distinguished from small molecules. It has a relatively large viscosity and a relatively high molecular weight, exhibits to be linear, and is capable of forming a network structure, so as to anchor the azopyridine derivative within a certain micro-domain and act as a binder. According to some embodiments of this disclosure, the number ratio of ethylene structural units to vinyl acetate structural units in the ethylene-vinyl acetate copolymer is 95/5-55/45, preferably 90/10-60/40, and more preferably 85/15-70/30. According to some embodiments of this disclosure, the weight average molecular weight of the ethylene-vinyl acetate copolymer is 10,000-100,000, preferably 30,000-80,000, and more preferably 40,000-60,000. According to some embodiments of this disclosure, the sealant comprises both the polyvinyl alcohol and the ethylene-vinyl acetate copolymer, and the mass ratio of the polyvinyl alcohol to the ethylene-vinyl acetate copolymer is 5/95-95/5, preferably 10/80-80/10, and more preferably 40/60-60/40.

As required, the sealant of one embodiment of this disclosure may comprise one or more solvents, or may not comprise any solvent. According to some embodiments of this disclosure, the solvent is one or more selected from dichloromethane, water, acetone, trichloromethane, etc.

In order to achieve the technical effect for providing a bezel-less liquid crystal display, according to some embodiments of this disclosure, the sealant comprises 1%-15%, preferably 5%-10%, and more preferably 8%-10% said azopyridine derivative and 85%-99%, preferably 90%-95%, and more preferably 90%-92% said one or more of polyvinyl alcohol and ethylene-vinyl acetate copolymer, based on the total mass of the one or more of polyvinyl alcohol and ethylene-vinyl acetate copolymer and the azopyridine derivative.

In order to better disperse the components such as the azopyridine derivative, the one or more of polyvinyl alcohol and ethylene-vinyl acetate copolymer, etc., and to achieve the sealing property of the sealant, the ratio of the total mass of the one or more of polyvinyl alcohol and ethylene-vinyl acetate copolymer and the azopyridine derivative to the mass of the solvent may be 80/20-50/50, preferably 70/30-60/40, and more preferably 70/30-75/35.

According to some embodiments of this disclosure, The sealant further comprises an ultraviolet absorbent to adjust the cure rate of the sealant upon the irradiation of ultraviolet. The ultraviolet absorbent may be one or more selected from (E)-6-(4-(4-(hexanesulfonyl)styryl)phenoxy)hexan-1-ol, phenyl o-hydroxybenzoate, 2,4-dihydroxybenzophenone, etc. The sealant may comprise 0.01%-0.5%, preferably 0.01%-0.3%, and more preferably 0.01%-0.2% said ultraviolet absorbent based on the total mass of the sealant.

The sealant according to one embodiment of this disclosure has an excellent bonding strength after curing and meets the requirement for binding in the field of liquid crystal displays so as to be capable of providing a bezel-less liquid crystal display complying with the requirement in the industry.

Furthermore, another embodiment of this disclosure provides a method for producing a bezel-less liquid crystal display, comprising:

applying the sealant according to those as described above to opposite inner sides of a plurality of oppositely placed fixing pieces;

loading liquid crystal molecules between an array substrate and a color filter substrate, performing cell alignment, and then placing the array substrate and the color filter substrate between the opposite inner sides of the plurality of the fixing pieces, so that bezels of the array substrate and the color filter substrate against the fixing pieces after the cell alignment are brought into contact with the sealant;

performing ultraviolet light irradiation on a structure obtained in step (2) to obtain a liquid crystal display panel with the bezel cured; and separating the liquid crystal display panel with the cured bezel from the fixing pieces.

According to some embodiments of this disclosure, the plurality of the fixing pieces are two oppositely placed fixing pieces.

According to some embodiments of this disclosure, the ultraviolet light has a wavelength of 350-380 nm, a light intensity of 400-1,000 mW/cm$^2$, and an irradiation time of 10 min-60 min.

According to some embodiments of this disclosure, in step (3), said performing ultraviolet light irradiation comprises irradiating the sealant with ultraviolet light from the side where the liquid crystal display panel lies. In this case, it is advantageous for the mixture to bend to the direction of ultraviolet light when the thermal expansion of the mixture occurs, i.e., bend to the side where the liquid crystal display panel lies, and it is in turn advantageous to bind the color filter substrate and the array substrate.

Furthermore, still another embodiment of this disclosure further provides a bezel-less liquid crystal display, which is produced by the method for producing a bezel-less liquid crystal display according to those as described above.

Figure 2:
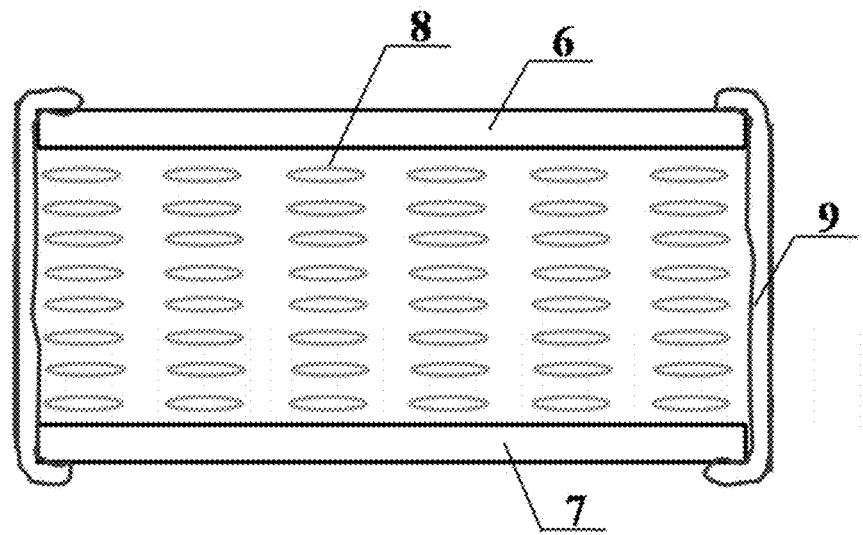
FIG. 2 is a schematic diagram of the structure of a bezel-less liquid crystal display of one embodiment according to this disclosure, wherein 6 represents a color filter substrate, 7 represents an array substrate, 8 represents liquid crystal molecules, and 9 represents a cured sealant comprising a mixture of one or more of polyvinyl alcohol and ethylene-vinyl acetate copolymer with an azopyridine derivative.

FIG. 2 shows a schematic diagram of the structure of a bezel-less liquid crystal display of one embodiment according to this disclosure, wherein 6 represents a color filter substrate, 7 represents an array substrate, 8 represents liquid crystal molecules, 9 represents a cured sealant comprising a mixture of an azopyridine derivative and one or more of polyvinyl alcohol and ethylene-vinyl acetate copolymer.

FIG. 3 is a structural schematic diagram of molecules of a sealant according to one embodiment of this disclosure in the process of a method for producing a bezel-less liquid crystal display, wherein 91 represents one or more of polyvinyl alcohol and ethylene-vinyl acetate copolymer and 92 represents an azopyridine derivative. According to a technical solution of one embodiment of this disclosure, a sealant comprising a mixture of an azopyridine derivative and one or more of polyvinyl alcohol and ethylene-vinyl acetate copolymer is first placed in preliminarily designed molds. After cell alignment has been performed with an array substrate and a color filter substrate on which liquid crystal molecules are dropped, the array substrate and the color filter substrate are placed between two molds which have the sealant, to bring both sides of a liquid crystal panel into contact with the sealant in the molds, and the sealant in the two molds is then irradiated with ultraviolet light. The azopyridine derivative converts light to thermal energy under the irradiation, the mixture is subjected to thermal expansion and bends to the direction of ultraviolet light, i.e., bends to the side where the liquid crystal display panel lies, so as to bind the color filter substrate and the array substrate. The liquid crystal display panel after binding is removed from the molds, so that a bezel-less liquid crystal display is produced.

FIG. 4 shows a process flow chart of a method for producing a bezel-less liquid crystal display according to one embodiment of this disclosure.

Figure 5:
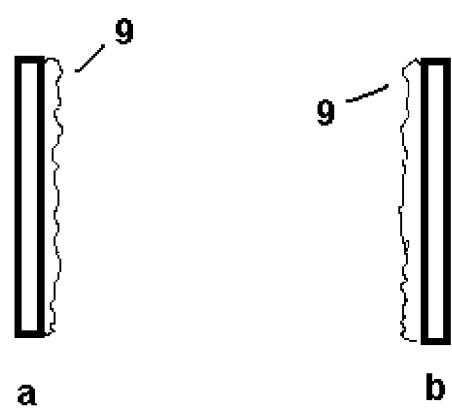
FIG. 5 is a schematic diagram of applying a sealant 9 according to one embodiment of this disclosure to opposite inner sides of two oppositely placed fixing pieces a and b.

A sealant comprising a mixture of an azopyridine derivative and one or more of polyvinyl alcohol and ethylene-vinyl acetate copolymer is first applied to opposite inner sides of a plurality of oppositely placed fixing pieces. FIG. 5 shows a schematic diagram of applying a sealant 9 comprising a mixture of an azopyridine derivative and one or more of polyvinyl alcohol and ethylene-vinyl acetate copolymer according to one embodiment of this disclosure to opposite inner sides of two oppositely placed fixing pieces a and b. The number of the fixing pieces used in the mold according to this disclosure is not particularly limited, and may be two, three, or more. Furthermore, the shape of the fixing pieces is not limited to the long-plate shape shown in FIG. 5, and may be any other shape which may be judged by a person skilled in the art. The shape and number of the fixing pieces are selected so that a plurality of fixing pieces are placed oppositely to each other, and the sealant according to this disclosure may be applied to opposite inner sides thereof.

Next, liquid crystal molecules are loaded between an array substrate and a color filter substrate, cell alignment is performed, and then the array substrate and the color filter substrate are placed between the opposite inner sides of the plurality of the fixing pieces, so that bezels of the array substrate and the color filter substrate against the fixing pieces after the cell alignment are brought into contact with the sealant.

Subsequently, ultraviolet light irradiation is performed on a structure obtained in the previous step to obtain a liquid crystal display panel with a cured bezel. Finally, the liquid crystal display panel with the cured bezel is separated from the fixing pieces.

EXAMPLES

Some technical solutions according to this disclosure will be specifically exemplified with Examples below. However, the Examples do not limit the scope of this invention in any way.

Example 1

2 g of an azopyridine derivative (wherein m was 8) represented by the structural formula (1), 98 g of polyvinyl alcohol (Shanxi Sanwei Group) (wherein the weight average molecular weight of the polyvinyl alcohol was 150,000), and 100 g of water were sufficiently and uniformly mixed to obtain a sealant 9, in which the mass ratio of the azopyridine derivative to polyvinyl alcohol was 2/98.

As shown in FIG. 5, the sealant 9 prepared above was applied to opposite inner sides of two oppositely placed fixing pieces a and b, which were used as molds.

Liquid crystal molecules were loaded between an array substrate and a color filter substrate, cell alignment was performed, and then the array substrate and the color filter substrate were placed between the opposite inner sides of the two fixing pieces, so that opposite bezels of the array substrate and the color filter substrate which were overlapped were brought into contact with the sealant.

The sealant in the molds was irradiated from the side where a liquid crystal display panel lay for 10 seconds by using ultraviolet light with a wavelength of 365 nm and a light intensity of 400 mW/cm$^2$ to allow the mixture to be subjected to thermal expansion and bend to the direction of ultraviolet light, i.e., bend to the side where the liquid crystal display panel lay, so as to bind the color filter substrate and the array substrate.

The liquid crystal display panel after binding was removed from the molds to produce a bezel-less liquid crystal display.

As can be seen from the above result, a sealant according to this disclosure had an excellent bonding strength after curing and could meet the requirement for binding in the field of liquid crystal displays so as to be capable of providing a bezel-less liquid crystal display complying with the requirement in the industry.

Example 2

10 g of an azopyridine derivative (wherein m was 12) represented by the structural formula (1), 90 g of polyvinyl alcohol (Shanxi Sanwei Group) (wherein the weight average molecular weight of the polyvinyl alcohol was 180,000), and 80 g of dichloromethane were sufficiently and uniformly mixed to obtain a sealant 9, in which the mass ratio of the azopyridine derivative to polyvinyl alcohol was 10/90.

As shown in FIG. 5, the sealant 9 prepared above was applied to opposite inner sides of two oppositely placed fixing pieces a and b, which were used as molds.

Liquid crystal molecules were loaded between an array substrate and a color filter substrate, cell alignment was performed, and the array substrate and the color filter substrate were then placed between the opposite inner sides of the two fixing pieces, so that opposite bezels of the array substrate and the color filter substrate which were overlapped were brought into contact with the sealant.

The sealant in the molds was irradiated from the side where a liquid crystal display panel lay for 15 seconds by using ultraviolet light with a wavelength of 365 nm and a light intensity of 400 mW/cm$^2$ to allow the mixture to be subjected to thermal expansion and bend to the direction of ultraviolet light, i.e., bend to the side where the liquid crystal display panel lay, so as to bind the color filter substrate and the array substrate.

The liquid crystal display panel after binding was removed from the molds to produce a bezel-less liquid crystal display.

As can be seen from the above result, a sealant according to this disclosure had an excellent bonding strength after curing and could meet the requirement for binding in the field of liquid crystal displays so as to be capable of providing a bezel-less liquid crystal display complying with the requirement in the industry.

Example 3

5 g of an azopyridine derivative (wherein m was 16) represented by the structural formula (1), 95 g of ethylene-vinyl acetate copolymer (wherein the number ratio of ethylene structural units to vinyl acetate structural units was 80/20 in the ethylene-vinyl acetate copolymer; and the weight average molecular weight of the ethylene-vinyl acetate copolymer was 50,000), and 60 g of water were sufficiently and uniformly mixed to obtain a sealant 9, in which the mass ratio of the azopyridine derivative to polyvinyl alcohol was 5/95.

As shown in FIG. 5, the sealant 9 prepared above was applied to opposite inner sides of two oppositely placed fixing pieces a and b, which were used as molds.

Liquid crystal molecules were loaded between an array substrate and a color filter substrate, cell alignment was performed, and then the array substrate and the color filter substrate were placed between the opposite inner sides of the two fixing pieces, so that opposite bezels of the array substrate and the color filter substrate which were overlapped were brought into contact with the sealant.

The sealant in the molds was irradiated from the side where a liquid crystal display panel lay for 15 seconds by using ultraviolet light with a wavelength of 365 nm and a light intensity of 400 mW/cm$^2$ to allow the mixture to be subjected to thermal expansion and bend to the direction of ultraviolet light, i.e., bend to the side where the liquid crystal display panel lay, so as to bind the color filter substrate and the array substrate.

The liquid crystal display panel after binding was removed from the molds to produce a bezel-less liquid crystal display.

As can be seen from the above result, a sealant according to this disclosure had an excellent bonding strength after curing and could meet the requirement for binding in the field of liquid crystal displays so as to be capable of providing a bezel-less liquid crystal display complying with the requirement in the industry.

It is to be understood by a person skilled in the art that various modifications and variations can be made without departing from the scope of this invention. Such modifications and variations are intended to fall in the scope of this invention defined by the appended claims.

What is claimed is:

1. A sealant, comprising:
    an azopyridine derivative represented by the following structural formula (1):

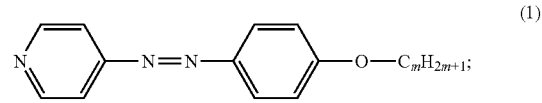

one or more of polyvinyl alcohol and ethylene-vinyl acetate copolymer; and
    a solvent,
    wherein m in the structural formula (1) is an integer of 8-20; and a mass ratio of the azopyridine derivative to the one or more of polyvinyl alcohol and ethylene-vinyl acetate copolymer is 1/99-15/85.

2. The sealant according to claim 1, wherein the polyvinyl alcohol has a weight average molecular weight of 130,000-220,000.

3. The sealant according to claim 1, wherein a number ratio of ethylene structural units to vinyl acetate structural units in the ethylene-vinyl acetate copolymer is 95/5-55/45.

4. The sealant according to claim 1, wherein the ethylene-vinyl acetate copolymer has a weight average molecular weight of 10,000-100,000.

5. The sealant according to claim 1, wherein the sealant comprises both of the polyvinyl alcohol and the ethylene-vinyl acetate copolymer, and a mass ratio of the polyvinyl alcohol to the ethylene-vinyl acetate copolymer is 5/95-95/5.

6. The sealant according to claim 1, wherein the solvent is one or more selected from the group consisting of dichloromethane, water, acetone, and trichloromethane.

7. The sealant according to claim 1, wherein a ratio of the total mass of the azopyridine derivative and the one or more of polyvinyl alcohol and ethylene-vinyl acetate copolymer to the mass of the solvent is 80/20-50/50.

8. The sealant according to claim 1, wherein the sealant further comprises an ultraviolet absorbent.

9. The sealant according to claim 8, wherein the ultraviolet absorbent is one or more selected from the group consisting of (E)-6-(4-(4-(hexanesulfonyl)styryl)phenoxy)hexan-1-ol, phenyl o-hydroxybenzoate, and 2,4-dihydroxybenzophenone.

10. The sealant according to claim 8, wherein the sealant comprises 0.01%-0.5% of the ultraviolet absorbent based on the total mass of the sealant.

11. A method for producing a bezel-less liquid crystal display, comprising:
    (1) applying the sealant according to claim 1 to opposite inner sides of a plurality of oppositely placed fixing pieces;
    (2) loading liquid crystal molecules between an array substrate and a color filter substrate, performing cell alignment, and then placing the array substrate and the color filter substrate between the opposite inner sides of the plurality of the fixing pieces, so that bezels of the array substrate and the color filter substrate against the fixing pieces after cell alignment are brought into contact with the sealant;

(3) performing ultraviolet light irradiation on a structure obtained in step (2) to obtain a liquid crystal display panel with a cured bezel; and (4) separating the liquid crystal display panel with the cured bezel from the fixing pieces.

12. The method for producing a bezel-less liquid crystal display according to claim 11, wherein the plurality of the fixing pieces are two oppositely placed fixing pieces.

13. The method for producing a bezel-less liquid crystal display according to claim 11, wherein the ultraviolet light has a wavelength of 350-380 nm, a light intensity of 400-1,000 mW/cm$^2$, and an irradiation time of 10-60 min.

14. The method for producing a bezel-less liquid crystal display according to claim 11, wherein in step (3), said performing ultraviolet light irradiation comprises irradiating the sealant with ultraviolet light from the side where the liquid crystal display panel lies.

15. A bezel-less liquid crystal display produced by the method for producing a bezel-less liquid crystal display according to claim 11.

* * * * *